United States Patent
Boenig et al.

(10) Patent No.: US 6,624,993 B1
(45) Date of Patent: Sep. 23, 2003

(54) ADJUSTABLE DIRECT CURRENT AND PULSED CIRCUIT FAULT CURRENT LIMITER

(75) Inventors: Heinrich J. Boenig, Los Alamos, NM (US); Josef B. Schillig, Los Alamos, NM (US)

(73) Assignee: The Regents of the University of California, Los Alamos, NM (US)

(*) Notice: Subject to any disclaimer, the term of this patent is extended or adjusted under 35 U.S.C. 154(b) by 526 days.

(21) Appl. No.: 09/721,834

(22) Filed: Nov. 22, 2000

(51) Int. Cl.[7] .................................................. H02H 3/00
(52) U.S. Cl. ........................ 361/93.1; 361/58; 361/82; 361/84
(58) Field of Search ........................ 361/93.1, 58, 115, 361/18, 78, 82, 84

(56) References Cited

U.S. PATENT DOCUMENTS

| | | | |
|---|---|---|---|
| 4,490,769 A | 12/1984 | Boenig | 361/58 |
| 4,958,380 A | * 9/1990 | Scuccato et al. | 388/806 |
| 5,726,848 A | 3/1998 | Boenig | 361/93 |
| 5,812,353 A | * 9/1998 | Albert et al. | 361/58 |
| 5,965,959 A | 10/1999 | Gamble et al. | 307/125 |
| 6,215,633 B1 | * 4/2001 | Galecki et al. | 361/93.9 |

* cited by examiner

Primary Examiner—Stephen W. Jackson
(74) Attorney, Agent, or Firm—Milton D. Wyrick

(57) ABSTRACT

A fault current limiting system for direct current circuits and for pulsed power circuit. In the circuits, a current source biases a diode that is in series with the circuits' transmission line. If fault current in a circuit exceeds current from the current source biasing the diode open, the diode will cease conducting and route the fault current through the current source and an inductor. This limits the rate of rise and the peak value of the fault current.

9 Claims, 2 Drawing Sheets

Direct current circuit with series connected fault current limiter

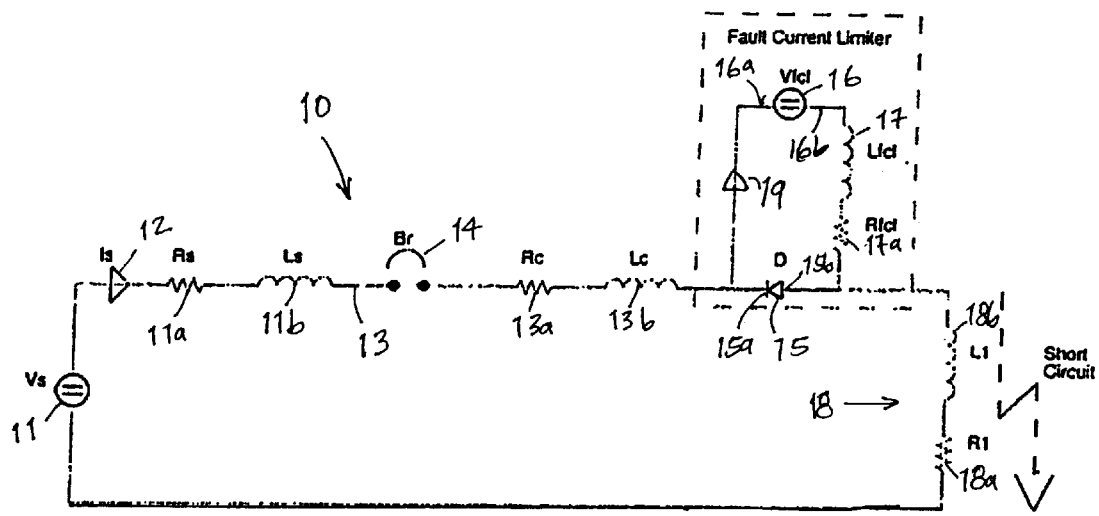
Figure 1: Direct current circuit with series connected fault current limiter
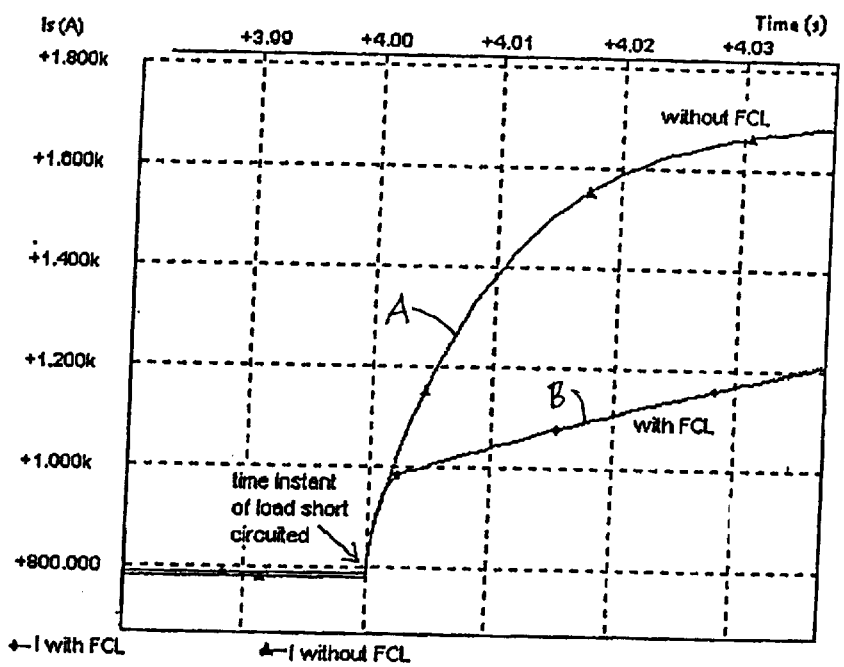
Figure 2: Source current during a load fault with and without fault current limiter

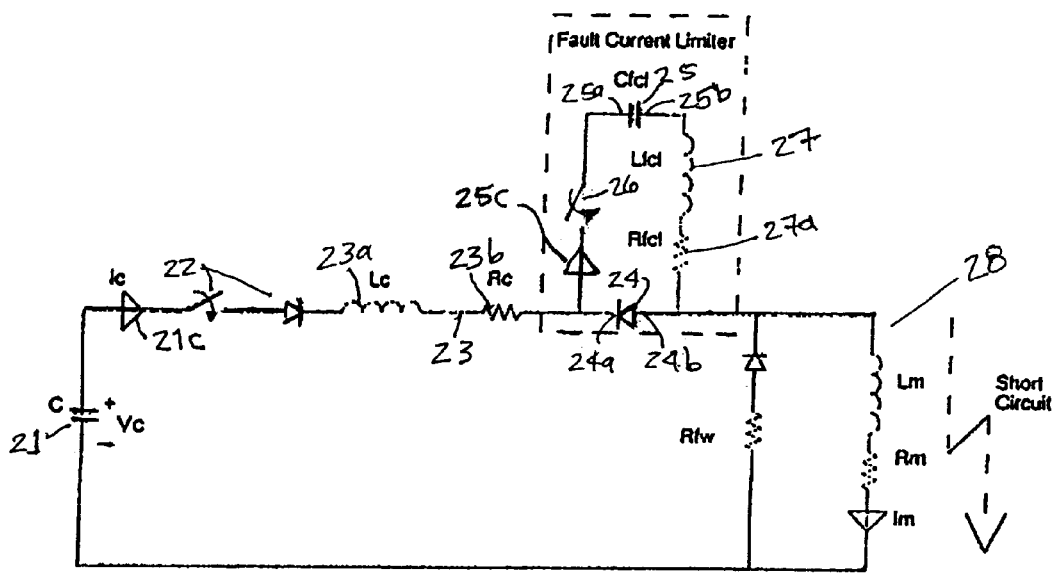
Figure 3: Pulsed power circuit for energizing a magnet with a fault current limiter
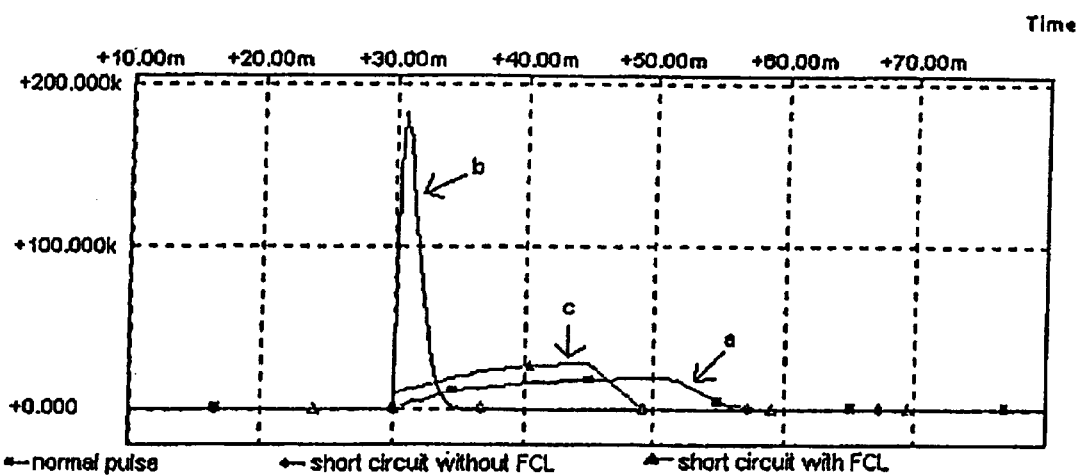
Figure 4: Source current for different load conditions
  a) normal magnet pulse
  b) magnet short circuit without fault current limiter
  c) magnet short circuit with fault current limiter

ADJUSTABLE DIRECT CURRENT AND PULSED CIRCUIT FAULT CURRENT LIMITER

This invention was made with Government support under Contract No. W-7405-ENG-36 awarded by the U.S. Department of Energy. The Government has certain rights in the invention.

The present invention generally relates to current limiting in electrical power systems, and, more particularly to limiting fault currents in direct current and pulsed circuit systems.

Direct current electricity is used in many applications involving commercial and experimental equipment. For example, most traction systems, such as subways, streetcars, other rapid transit systems, and ship and submarine power distribution systems use direct current energy supplies. In research, direct current pulses are used in high energy and pulsed power experiments. Often, this equipment utilizes high currents to achieve a desired result.

Like all electrical systems, these direct current systems must have protective devices to shut them down in the event of a fault so that both the loads served and the direct current supply system are not damaged. Traditionally, this protection has been in the form of electro-mechanical circuit breakers. However, these circuit breakers are relatively slow, since the circuit interruption function is mechanical. This interruption time is sufficiently long as to potentially allow damage to sensitive equipment on the system.

For the design of any electrical system, it is necessary to calculate as accurately as possible the maximum current in the system, which usually occurs in a fault situation. From this information, the ratings of the electrical components, such as the wire sizes and breaker ratings are determined. However, if there were a way to limit the maximum fault current to a lower amount, the ratings of the circuit components such as wires and breakers would be lowered. Lower ratings mean that less expensive equipment could be used in the system.

The present invention provides just such a fault current limiting function, allowing direct current systems to be designed for currents only slightly above the normal load current. The invention accomplishes this through the virtually instantaneous insertion of an inductance into the fault circuit, providing a period during which the fault current is limited in value, allowing sufficient time for the separate circuit breaker to interrupt a lower fault current. This ability of the present invention allows for an overall circuit to be designed for a lower available fault current. By appropriate choice of the bias current source, the present invention can even be used to force the fault current to zero, if a fault is detected, further reducing the required equipment ratings.

It is therefore an object of the present invention to provide apparatus and method for limiting fault currents in direct current systems.

It is another object of the present invention to apparatus and method for allowing minimization of component ratings for a direct current system.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, a solid-state fault current limiting system for a direct current circuit including a direct current voltage source, having a source impedance, a direct current circuit breaker, a transmission line, having a line impedance including all line impedances of said direct current circuit, and a load, the solid-state current limiting system comprises a diode having a cathode and an anode, the cathode being connected to the transmission line, and the anode being connected to a first pole of said load. A controllable direct current source having a first pole is connected to the cathode of the diode. An inductor having an impedance greater with respect to the source impedance of the direct current voltage source and the line impedance of the transmission line, is connected between a second pole of the controllable direct current source and the anode of the diode. In operation, the controllable direct current source biases the diode into a conducting state until fault current from the direct current voltage source is greater in value than current flowing through the diode from the controllable direct current source, causing the diode to cease conducting, thereby routing the fault current through the controllable direct current source and the inductor and limiting rate of rise of the fault current until the circuit breaker opens.

In another aspect of the present invention and in accordance with its principles and purposes a solid-state fault current limiting system for a pulsed power load, such as a magnet, energized through a closing switch by a pulsed power source, such as a capacitor bank, having a source impedance and producing a pulse period, and a transmission line having a line impedance, the solid-state fault limiting system comprising a diode having a cathode and an anode, the cathode being connected to the closing switch through said transmission line and the anode being connected to the pulsed power load. An auxiliary pulsed current source has a first pole connected to the cathode of said diode. An inductor having an impedance greater with respect to the source impedance and the line impedance is connected between a second pole of the auxiliary pulsed current source and the anode of the diode. In operation, the auxiliary pulsed current source biases the diode into a conducting state for a time period longer than the pulse period of the pulsed power source when discharged into the pulsed power load, until fault current from the pulsed power source exceeds current from the auxiliary pulsed current source, causing the diode to cease conducting and route the fault current through the auxiliary pulsed current source and the inductor, thereby limiting rate of rise and peak value of the fault current.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 1 is a schematic of one embodiment of the present invention installed in a direct current circuit.

FIG. 2 is a plot of load fault in a direct current circuit both with and without the present invention installed in the circuit.

FIG. 3 is a schematic of another embodiment of the present invention installed in a direct current pulsed power circuit.

FIG. 4 is a plot showing at a) a normal pulse in a pulsed power circuit, at b) a load fault trace without benefit of the present invention, and at c) a load fault trace with the present invention installed in the circuit.

DETAILED DESCRIPTION

The present invention provides fault current limiting capability for direct current circuits and pulsed power systems. This allows a direct current system to be designed with components having lower ratings because of the lowering of the available fault current. It accomplishes this through application of a diode and biasing arrangement that forces the fault current to flow through an inductance during a fault. The inductance instantaneously limits the rate of rise of the fault current. The invention can be most easily understood through reference to the drawings.

Referring first to FIG. 1, there can be seen a schematic of at typical direct current (dc) circuit 10, having a voltage source 11 having an internal resistance 11a, and internal inductance 11b, and producing current 12 in transmission line 13. Voltage source 11 can be any appropriate source of dc voltage, such as a battery, a line-commutated converter or a chopper type dc supply. Transmission line 13 has internal resistance 13a and internal inductance 13b, and is interrupted by circuit breaker 14.

In the configuration shown, the present invention is inserted into transmission line 13 downstream of circuit breaker 14. However, it is important to note that the insertion position in circuit 10 is not important and can be placed in any appropriate position. As illustrated, the embodiment of the invention for typical direct current circuits is shown with diode 15 having its cathode 15a connected to transmission line 13. Cathode 15a also is connected to one pole 16a of controllable current source 16. The other pole 16b is connected to inductor 17 that defines an internal resistance 17a. Inductor 17 has an inductance value several times greater than the total impedance associated with voltage source 11 and with transmission line 13. Anode 15b of diode 15 is connected to resistance 17a and to load 18, which is represented by load resistance 18a and load inductance 18b. The other pole of load 18 is connected back to voltage source 11.

In operation of this embodiment, controllable current source 16 maintains predetermined bias current 19 flowing in a clockwise direction through inductor 17 and diode 15, at a predetermined current level slightly higher than any expected current from voltage source 11 during normal operation of circuit 10. This predetermined current level of predetermined bias current 19 is sufficient to bias diode 15 into a conducting state, allowing current 12 from voltage source 11 to pass through diode 15 to load 18 during normal operation of dc circuit 10.

In the event of a fault, current 12 will quickly rise to a level greater than predetermined bias current 19, causing diode 15 to become reverse biased and to turn off. This action causes current 12 to flow through controllable current source 16, and inductor 17, which limits the rate of rise of current 12 until circuit breaker 14 can open. This functioning of circuit 10 in fault conditions allows a design that minimizes the ratings of components since maximum fault current levels are limited to a fraction of the fault current levels without the present invention.

In circuit 10, when controllabe current source 16 is chosen to be a bipolar current source, controllable current source 16 can be used to force the fault current and bias current 19 in circuit 10 to zero. To achieve this zero current result, the amplitude of the bipolar voltage source must be higher than the amplitude of voltage source 11. One example of an appropriate bipolar current source would be a line-commutated converter.

FIG. 2 illustrates the beneficial affect of the present invention on a direct current circuit through examples of a fault both without and with the invention in place. As shown at curve A, the steady state current of the circuit is slightly less than 800 amperes when a fault occurs at time +4.00 seconds, and the current begins to rise quickly to more than 1600 amperes. However, curve B illustrates how the present invention dramatically limits the rise of the fault current so that after 0.03 seconds, the fault current is less than 1200 amperes. This illustration shows how the present invention affects the sizing of breakers and transmission lines.

FIG. 3 shows another embodiment of the invention for use with direct current pulsed power circuits. As shown, pulsed power circuit 20 employs a pulsed power source 21, having source inductance 21a and source resistance 21b, and producing pulse 21c. Pulsed power source 21 can be any appropriate power source, such as a capacitor bank, as shown in FIG. 3. Pulsed power source 21 is connected to closing switch 22, represented as a switch with a diode 22a, and which would normally be either a thyristor or an ignitron assuring that current flows in only one direction. Closing switch 22, in turn, is connected to one-end of transmission line 23, having line inductance 23a and line resistance 23b.

The opposite end of transmission line 23 is connected to the elements of this embodiment of the present invention, being cathode 24a of diode 24. Transmission line 23 is connected also to one side of connecting switch 26, which is closed a short time before the firing of pulsed power source 21. The other side of connecting switch 26 is connected to pole 25a of auxiliary pulsed current source 25 that produces biasing pulse 25c. Pole 25b of auxiliary pulsed current source 25 is connected through inductor 27, having internal resistance 27a, to anode 24b of diode 24 and to load 27.

Again the impedance associated with inductor 27 is several times greater than the total of the impedance associated with pulsed power source 21 and with transmission line 23. Auxiliary pulsed power source 25 also can be a capacitor bank as shown, or any other method of producing an appropriate controlled pulse. Load 28 is represented as a magnet having resistance 28a and inductance 28b and in parallel, resistance 28c in series with diode 28d.

In operation, at a predetermined time prior to initiation of current pulse 21c from pulsed power source 21, auxiliary pulsed power source 25 produces pulse 25c, upon closure of connecting switch 26, having somewhat greater magnitude, and duration longer, than current pulse 21c. Pulse 25c biases diode 24 into an open state so that pulse 21c passes through diode 24 to load 27. However, in the event of a fault, the fault current of pulse 21c would exceed the current of pulse 25c, biasing diode 24 off, thereby forcing the fault current of pulse 21c to flow through inductor 26, which limits the rise of the fault current of pulse 21c.

Referring now to FIG. 4, there can be seen at a. curve 31 representing a normal pulse 21c for a magnet pulse. As shown, the normal pulse peaks at approximately 30 kiloamperes. The fault current of. pulse 21c, caused by a fault in pulsed power circuit 20 (FIG. 3), is illustrated at b. and shows the steep rise of the fault current to approximately 180 thousand amperes. This is a potentially catastrophic level that could cause serious damage to the entire pulsed power circuit 20 (FIG. 3). At c, it is seen, with the present invention installed in pulsed power circuit 20 (FIG. 3). As shown, with a fault, the fault current pulse rises only slightly above the normal pulse height, and is brought to zero earlier than the normal pulse at a.

As an example, using dc circuit 10 of FIG. 1, assume controllable current source 16 is controlling the level of predetermined bias current 19 to 980 amperes, which is flowing through inductor 17 and diode 15, flowing from anode 15b to cathode 15a. This current opens diode 15, allowing current 12 from voltage source 11, assumed to be 800 amperes, to flow through it to load 18. However, in the event of a fault in dc circuit 10, current 12 would rise quickly above 800 amperes, causing diode 15 to turn "off" when the fault current exceeds 980 amperes. This blocking action by diode 15 causes current 12 to flow through controlled current source 16 and inductor 17, which acts to reduce the rate of rise in current 12 to allow circuit breaker 14 to open at a level of current 12 far below the available fault current for dc circuit 10.

Refer now to FIG. 2, and assume that circuit breaker 14 has an opening time of 30 ms and a triggering current of 1000 amperes. From the plot in FIG. 2, it can be seen that circuit breaker 14 would have to interrupt approximately 1680 amperes without the present invention installed in dc circuit 10 (FIG. 1). However, with the present invention installed in dc circuit 10, circuit breaker 14 would have to interrupt only approximately 1280 amperes. A similar result occurs in the pulsed power system of FIG. 3.

It should be clear to those with skill in this art that the present invention allows the entire dc circuit 10 (FIG. 1) and pulsed power circuit 20 (FIG. 3) to be designed for lower fault current ratings. This makes implementations of these circuits much less expensive.

The foregoing description of the preferred embodiments of the invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A solid-state fault current limiting system for a direct current circuit including a direct current voltage source, having a source impedance, a direct current circuit breaker, a transmission line, having a line impedance including all line impedances of said direct current circuit, and a load, said solid-state current limiting system comprising:

a diode having a cathode and an anode, said cathode being connected to said transmission line, and said anode being connected to a first pole of said load;

a controllable direct current source having a first pole connected to said cathode of said diode;

an inductor having an impedance greater with respect to said source impedance of said direct current voltage source and said line impedance of said transmission line, said inductor being connected between a second pole of said controllable direct current source and said anode of said diode;

wherein said controllable direct current source biases said diode into a conducting state until fault current from said direct current voltage source is greater in value than current flowing through said diode from said controllable direct current source, causing said diode to cease conducting, thereby routing said fault current through said controllable direct current source and said inductor and limiting rate of rise of said fault current until said circuit breaker opens.

2. The solid-state fault current limiting system as described in claim 1 wherein said controllable direct current source comprises a line-commutated converter.

3. The solid-state fault current limiting system as described in claim 1, wherein said controllable direct current source is a bipolar voltage source having an amplitude greater than that of said direct current voltage source, allowing said fault current and any bias current to be reduced to zero.

4. The solid-state fault current limiting system as described in claim 1 wherein said controllable direct current source comprises a chopper-type direct current supply.

5. The solid-state fault current limiting system as described in claim 1 wherein said controllable direct current source comprises a battery.

6. The solid-state fault current limiting system as described in claim 1 wherein said inductor has an impedance value greater than that of said source impedance and said all line impedances of said direct current circuit, said impedance value of said inductor being determined by an appropriate amperage value of said fault current for interrupting by said circuit breaker.

7. A solid-state fault current limiting system for a pulsed power load, such as a magnet, energized through a closing switch by a pulsed power source, such as a capacitor bank, having a source impedance and producing a pulse period, and a transmission line having a line impedance, said solid-state fault limiting system comprising:

a diode having a cathode and an anode, said cathode being to said closing switch through said transmission line and said anode being connected to said pulsed power load;

an auxiliary pulsed current source having a first pole connected to said cathode of said diode;

an inductor having an impedance greater with respect to said source impedance and said line impedance connected between a second pole of said auxiliary pulsed current source and said anode of said diode;

wherein said auxiliary pulsed current source biases said diode into a conducting state for a time period longer than said pulse period of said pulsed power source when discharged into said pulsed power load, until fault current from said pulsed power source exceeds current from said auxiliary pulsed current source, causing said diode to cease conducting and routing said fault current through said inductor, thereby limiting rate of rise and peak value of said fault current.

8. The solid-state fault current limiting system as described in claim 7 wherein said auxiliary pulsed current source comprises a capacitor bank.

9. The solid-state fault current limiting system as described in claim 7 wherein said inductor has an impedance value greater than that of said source impedance and said all line impedances of said direct current circuit, said impedance value of said inductor being determined by an appropriate amperage value of said fault current for interrupting by said circuit breaker.

* * * * *